(12) United States Patent
Hars

(10) Patent No.: US 11,068,589 B2
(45) Date of Patent: Jul. 20, 2021

(54) INTERFERENCE DETECTING RING OSCILLATORS

(71) Applicant: THE BOEING COMPANY, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 557 days.

(21) Appl. No.: 15/853,188

(22) Filed: Dec. 22, 2017

(65) Prior Publication Data
US 2019/0384908 A1    Dec. 19, 2019

(51) Int. Cl.
*G06F 21/55*    (2013.01)
*H03K 3/03*    (2006.01)
*G06F 7/58*    (2006.01)

(52) U.S. Cl.
CPC ......... *G06F 21/554* (2013.01); *H03K 3/0315* (2013.01); *G06F 7/588* (2013.01); *G06F 2221/034* (2013.01)

(58) Field of Classification Search
CPC ..... H03K 3/0315; G06F 21/554; G06F 7/588; G06F 2221/034
See application file for complete search history.

(56) References Cited

U.S. PATENT DOCUMENTS

| 9,762,241 B1 | 9/2017 | Augustine et al. | |
| 2008/0270049 A1* | 10/2008 | Kim | G01R 31/31937 702/58 |
| 2013/0212140 A1* | 8/2013 | Forehand | G06F 7/588 708/251 |
| 2014/0266473 A1* | 9/2014 | Lewis | H03K 3/0315 331/46 |
| 2015/0244377 A1* | 8/2015 | Au Yeung | H03L 1/00 331/66 |
| 2016/0329882 A1* | 11/2016 | Liu | H01L 27/11807 |

FOREIGN PATENT DOCUMENTS

EP    2 081 170 A1    7/2009

OTHER PUBLICATIONS

European Search Report dated Mar. 8, 2019; European Application No. 18210280.6-1206.
Edward Suh et al., "Physical Unclonable Functions for Device Authentication and Secret Key Generation", Jun. 1, 2007, pp. 9-14.

* cited by examiner

*Primary Examiner* — Trang T Doan
*Assistant Examiner* — Jessica J South
(74) *Attorney, Agent, or Firm* — Womble Bond Dickinson LLP

(57) ABSTRACT

A system for providing security in a computer system is provided. The system includes a plurality of ring oscillators and one or more logic circuits. The ring oscillators are equipped with a respective plurality of counters to count impulses of oscillating outputs of the ring oscillators. The one or more logic circuits start and stop the respective plurality of counters over repeated counting periods, and select a group of ring oscillators from the plurality of ring oscillators. The one or more logic circuits also determine a correlation between oscillating outputs of the group of ring oscillators. The one or more logic circuits further generate a notification indicating interference in the group of ring oscillators and thereby the plurality of ring oscillators when the correlation is above a predefined threshold correlation.

20 Claims, 3 Drawing Sheets

INTERFERENCE DETECTING RING OSCILLATORS

TECHNOLOGICAL FIELD

The present disclosure generally relates to providing security in a computer system, in particular, to providing security in a computer system using interference detecting ring oscillators.

BACKGROUND

Some electronic components in integrated circuits are sensitive to interferences that are generated in the integrated circuits or injected from outside. Ring oscillators are such interference sensitive circuits. Ring oscillators can be used as entropy sources to generate true random numbers used in information security. However, when ring oscillators are used as entropy sources and get synchronized to an interference signal, the randomness in their phase drift is destroyed. Thus, an unauthorized third party can know the phase drift by controlling or measuring the interference and recreate the true random numbers generated by the ring oscillators to harm information security.

One existing solution to reduce interference sensitivity of ring oscillators is to use physical protection such as shields or filters. Another existing solution is to use logic gates that are less sensitive to interference. However, the exiting solutions are expensive, fragile, slow, and hard to evaluate or design.

Therefore it would be desirable to have a system and method that take into account at least some of the issues discussed above, as well as other possible issues.

BRIEF SUMMARY

Example implementations of the present disclosure are directed to providing security in a computer system using interference detecting ring oscillators. In contrast to the existing solutions, example implementations provide interference detection by employing multiple ring oscillators to detect any strong correlation between the oscillation signals of the ring oscillators. Example implementations can detect interference before it can cause any harm to information security.

The present disclosure thus includes, without limitation, the following example implementations.

Some example implementations provide a method implemented by a system for providing security in a computer system. The system comprises a plurality of ring oscillators that are identical as designed but have different oscillation frequencies as manufactured, the plurality of ring oscillators being equipped with a respective plurality of counters configured to count impulses of oscillating outputs of the plurality of ring oscillators. The method comprises: starting the respective plurality of counters, and stopping the respective plurality of counters, over repeated counting periods; selecting a group of ring oscillators from the plurality of ring oscillators, the group of ring oscillators being equipped with a respective group of counters of the respective plurality of counters; determining a correlation between oscillating outputs of the group of ring oscillators based on counter values obtained from the respective group of counters over the repeated counting periods, the counter values indicating oscillation frequencies of respective ring oscillators of the group of ring oscillators; and generating a notification indicating interference in the group of ring oscillators and thereby the plurality of ring oscillators when the correlation is above a predefined threshold correlation.

In some example implementations of the method of any preceding example implementation, or any combination of preceding example implementations, the group of ring oscillators is a pair of ring oscillators, and selecting the group of ring oscillators includes selecting the pair of ring oscillators from the plurality of ring oscillators.

In some example implementations of the method of any preceding example implementation, or any combination of preceding example implementations, selecting the group of ring oscillators includes sorting counter values from the respective plurality of counters, and selecting the group of ring oscillators based on similarity of the counter values from the respective group of counters with which the group of ring oscillators is equipped.

In some example implementations of the method of any preceding example implementation, or any combination of preceding example implementations, selecting the group of ring oscillators further includes clustering the counter values from the respective plurality of counters into one or more clusters of counter values based on similarity of the counter values, and selecting a cluster of the one or more clusters that includes the counter values from the respective group of counters with which the group of ring oscillators is equipped.

In some example implementations of the method of any preceding example implementation, or any combination of preceding example implementations, determining the correlation between the oscillating outputs of the group of ring oscillators includes determining a difference between the counter values (e.g., a sequence of differences between repeatedly restarted counter values) from the respective group of counters, and wherein generating the notification includes generating the notification when the difference between at least a predefined portion of the counter values (e.g., in the sequence) from the respective group of counters is below a predefined threshold difference that indicates the correlation is above the predefined threshold correlation.

In some example implementations of the method of any preceding example implementation, or any combination of preceding example implementations, determining the correlation includes: generating a sequence of bit values for the group of ring oscillators based on the counter values from the respective group of counters (e.g., periodically restarted counters), each bit value of the sequence indicating whether the difference between a pair of the counter values from the respective group of counters is above or below the predefined threshold difference; and applying a filter to the sequence to generate a filter value that indicates the correlation.

In some example implementations of the method of any preceding example implementation, or any combination of preceding example implementations, determining the difference includes performing arithmetic subtraction or exclusive-or operations on the counter values from the respective group of counters.

In some example implementations of the method of any preceding example implementation, or any combination of preceding example implementations, selecting the group of ring oscillators includes selecting multiple groups of ring oscillators from the plurality of ring oscillators, wherein determining the correlation includes determining correlations between the oscillating outputs of the multiple groups of ring oscillators, and wherein generating the notification includes generating the notification when any of the correlations is above the predefined threshold correlation.

In some example implementations of the method of any preceding example implementation, or any combination of preceding example implementations, generating the notification includes at least one of generating a visual or audible notification, causing the computer system to shut down or causing the computer system reset.

Some example implementations provide a system for providing security in a computer system, the system comprising one or more logic circuits configured to at least perform the method of any preceding example implementation, or any combination of preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
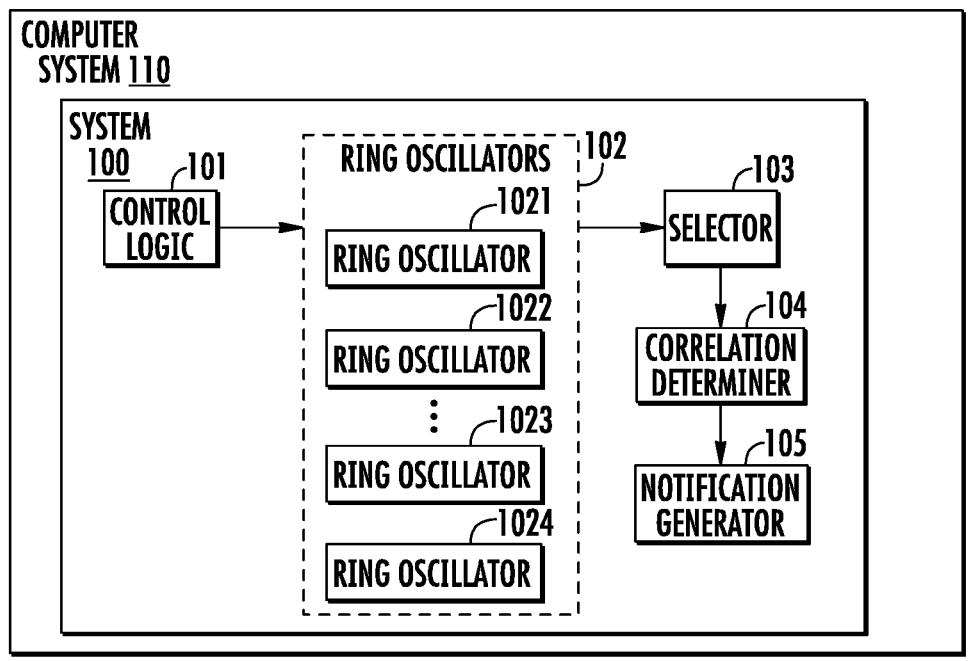
FIG. 1 illustrates a system for providing security in a computer system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to providing security in a computer system, in particular, to providing security in a computer system using interference detecting ring oscillators.

FIG. 1 illustrates a system 100 for providing security in a computer system 110 according to example implementations of the present disclosure. The computer system may include the system as shown. For example, the computer system may be equipped with the system. In another example, the computer system and the system may be two separate systems.

The system 100 may include one or more of each of a number of components, units or the like (generally "components") at least some of which may include or be implemented with logic circuits such as multiplexers, registers, arithmetic logic units, memory, microprocessors and the like. The system may be designed for any of a number of different applications, and may have particular applicability to provide interference detection ability to the system and provide security in the computer system 110.

The computer system 110 may include a processor and a computer-readable storage medium or memory coupled to the processor, where the processor is configured to execute computer-readable program code including one or more computer program stored in the memory. It will also be understood that one or more functions, and combinations of functions, may be implemented by special purpose electronic hardware-based systems and/or processors which perform the specified functions, or combinations of special purpose hardware and program code instructions.

Figure 2:
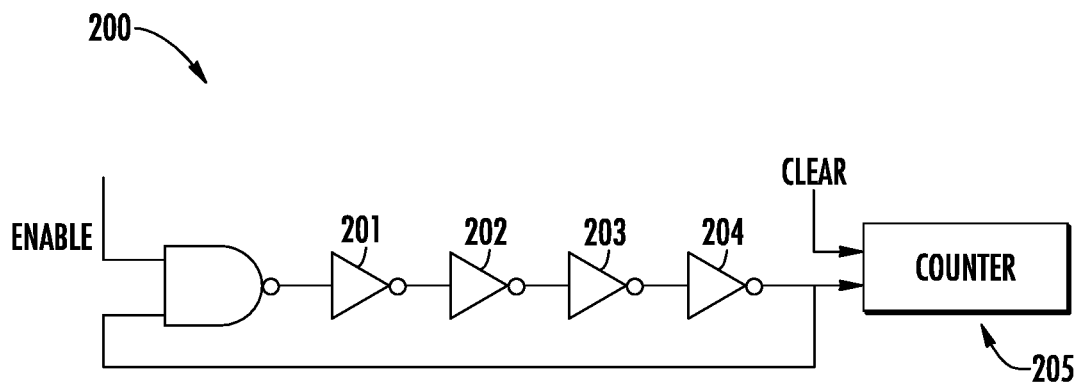
FIG. 2 illustrates a ring oscillator in the system, according to various example implementations.

In some examples, as shown, the system 100 includes a control logic 101 and a plurality of at least 2 ring oscillators 102, i.e., the ring oscillators 1021-1024. The ring oscillators are identical as designed but have different oscillation frequencies as manufactured. Manufacturing variations within their tolerances make the identically designed ring oscillators slightly different. These random differences cannot be predicted or replicated, and they make the ring oscillators oscillate at different frequencies, which may vary with temperature and supply voltage. The ring oscillators are equipped with a respective plurality of counters configured to count impulses of oscillating outputs of the plurality of ring oscillators (as shown in FIG. 2 below).

In some examples, the control logic 101 is configured to start the respective plurality of ring oscillators. In other examples the ring oscillators are running continuously, and the control logic 101 is configured to reset, and start the respective plurality of counters, and stop the respective plurality of counters, over repeated counting periods to measure frequencies of the plurality of ring oscillators 102, i.e., the ring oscillators 1021-1024. For example, the counters can measure the frequencies by counting the oscillation periods of the ring oscillators over the repeated counting periods.

In some examples, a selector 103 of the system 100 is configured to select a group of ring oscillators from the plurality of ring oscillators 102. The group of ring oscillators is equipped with a respective group of counters of the respective plurality of counters. The selector can provide information of the selected group of ring oscillators to a correlation determiner 104 of the system.

In some examples, the correlation determiner 104 is configured to determine a correlation between oscillating outputs of the group of ring oscillators. The correlation is determined based on counter values obtained from the respective group of counters over the repeated counting periods. The counter values indicate oscillation frequencies of respective ring oscillators of the group of ring oscillators. The correlation determiner can provide the determined correlation to a notification generator 105 of the system.

In some examples, the notification generator 105 is configured to generate a notification indicating interference in the group of ring oscillators and thereby the plurality of ring oscillators 102 when the correlation is above a predefined threshold correlation.

In some examples, the group of ring oscillators is a pair of ring oscillators, and the selector 103 is configured to select the pair of ring oscillators from the plurality of ring oscillators 102. For example, the selector can select the group including two ring oscillators 1021 and 1022. In other examples, the selected group of ring oscillators can include a different number of ring oscillators, e.g., 3 or 4 ring oscillators.

Figure 3:
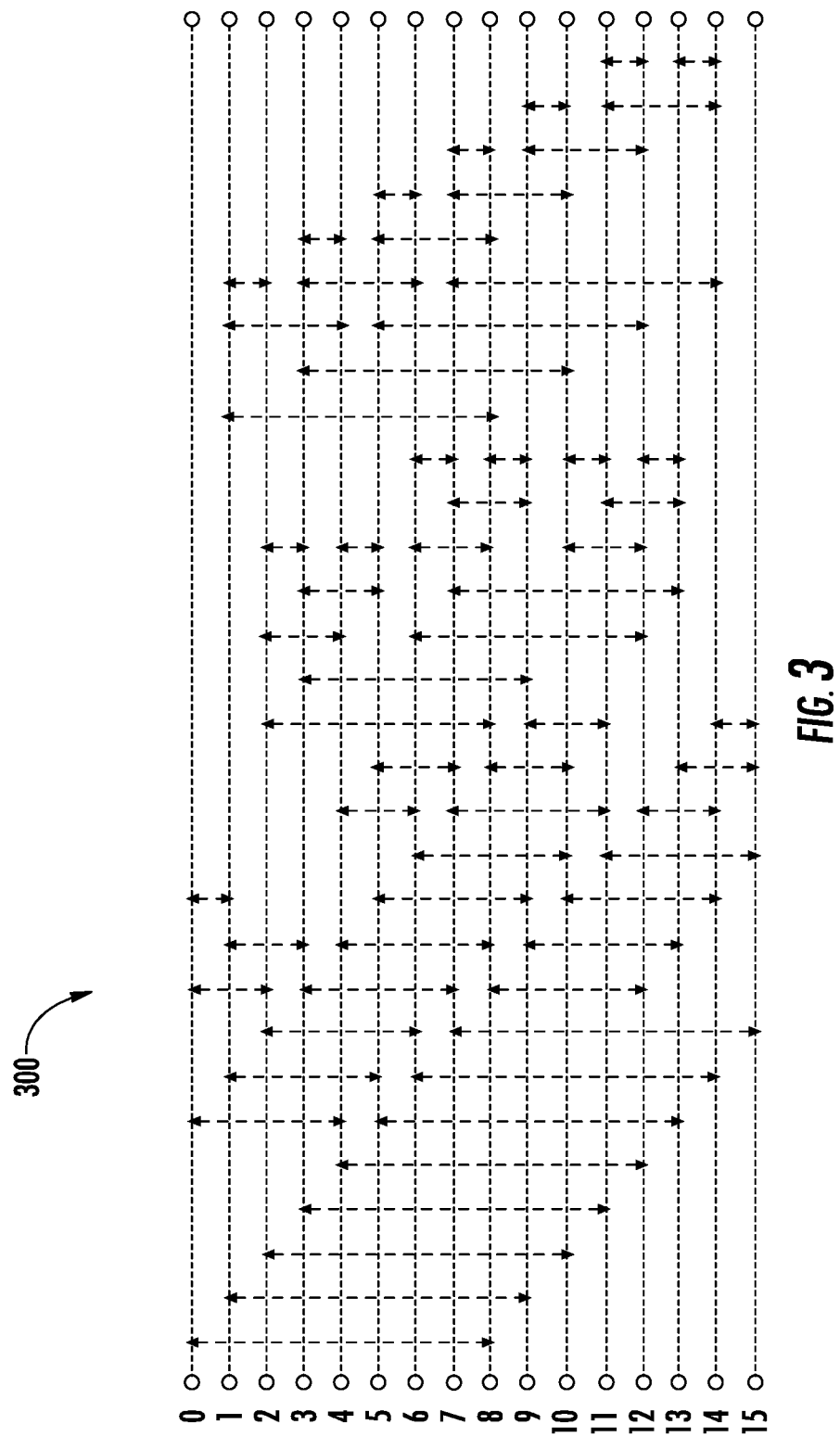
FIG. 3 illustrates a diagram of a sorting network for the counter values for a plurality of ring oscillators, according to various example implementations.

In some examples, the selector 103 is configured to sort the first counter values from the sequence of counter values of the respective plurality of counters. For example, the selector can sort the counter values based on a sorting network as shown in FIG. 3 below. The selector is also configured to select the group of ring oscillators based on similarity of the counter values from the respective group of counters with which the group of ring oscillators is equipped. For example, the selector can select two ring oscillators 1021 and 1022 if the first counter values of the two ring oscillators are close (e.g., the difference of the counter values is less than 1%).

In some examples, the selector 103 is configured to cluster the first counter values from the respective plurality of counters into one or more clusters of counter values based on similarity of the first counter values. For example, the selector can cluster the ring oscillators 1021 and 1022 into one cluster and cluster the ring oscillators 1023 and 1024 into another cluster. The selector is also configured to select a cluster of the one or more clusters that includes the counter values from the respective group of counters with which the group of ring oscillators is equipped.

In some examples, the correlation determiner 104 is configured to determine a difference between the counter values (e.g., a sequence of differences between repeatedly restarted counter values) from the respective group of counters. The notification generator 105 is configured to generate the notification when the difference between at least a predefined portion of the counter values (e.g., in the sequence) from the respective group of counters is below a predefined threshold difference that indicates the correlation is above the predefined threshold correlation. That is, when in the sequence of counter differences at least a predefined portion of the values from the respective group of counters is below a predefined threshold difference that indicates the correlation is above the predefined threshold correlation.

In some examples, the correlation determiner 104 is configured to generate a sequence of bit values for the group of ring oscillators based on the counter values from the respective group of (periodically or repeatedly restarted) counters. Each bit value of the sequence indicates whether the difference between a pair of the corresponding counter values from the respective group of counters is above or below the predefined threshold difference. The correlation determiner is also configured to apply a digital filter (e.g., a FIR or IIR filter) to the sequence to generate a filter value that indicates the correlation. In some examples, the correlation determiner is configured to perform exclusive-or (XOR) operations on the counter values from the respective group of counters. In other examples the correlation determiner is configured to compute the arithmetic differences (arithmetic subtraction) from the largest counter value.

In some examples, the selector 103 is configured to select multiple groups of ring oscillators from the plurality of ring oscillators. For example, the selector can select two groups. One of the two groups includes the ring oscillators 1021 and 1022, the other group includes the ring oscillators 1023 and 1024. In these examples, the correlation determiner 104 is configured to determine correlations between the oscillating outputs of the multiple groups of ring oscillators. The notification generator 105 is configured to generate the notification when any of the correlations is above the predefined threshold correlation.

In some examples, the notification generator 105 is configured to generate a visual or audible notification, or cause the computer system 110 to shut down or reset. For example, the notification generator can send an alarm or warning to the operator of the computer system. The notification generator may also reset or shut down the computer system.

FIG. 2 illustrates a ring oscillator 200 in the system 100, according to various example implementations. In some examples, the ring oscillator 200 can be any one of the ring oscillators 1021-1024 in the system 100 as described in FIG. 1. The ring oscillators are configured to have an enable input, which is driven by the control logic 101.

In one example, the ring oscillator 200 may include a plurality of logic gates, of which an odd number of logic gates invert their inputs, connected to the output of a previous logic gate, all of which are connected in a ring configuration, e.g., inverters 201-204 and the negative-AND (NAND) gate as shown in FIG. 2. The first of the plurality of inverters, e.g., the inverter 201, receives an input and generates an output (a logical negation of the input) as an input to the next inverter in the ring configuration, e.g., the inverter 202. An output of each except a last of the plurality of inverters is used as an input for a next one of the plurality of inverters. The output of the last of the plurality of inverters, e.g., the inverter 204, is fed back to and used as an input for the first of the plurality of inverters, e.g., the inverter 201.

In some examples, the ring oscillator 200 is equipped with a counter 205 that is configured to count impulses of oscillating outputs of the ring oscillator. For example, as shown in FIG. 2, the output of the last of the plurality of inverters, e.g., the inverter 204, is sent to the counter. The counter generates counter values by counting oscillation periods in one or more predefined counting periods. The counter values indicate the oscillation frequency of the ring oscillator 200.

The ring oscillator 200 can be used as an entropy source to generate true random numbers used in information security, because the circuit noise causes phase drift, manifested in fluctuation of the oscillator frequency. However, in one example, a strong interference signal can affect the ring oscillator as noise. The interference may not be random. The effects of true random noise of the ring oscillator can be masked by the strong interference signal, which destroys all or most of the entropy generated by the ring oscillator. The strong interference signal may originate from devices in the working environment of the computing system, such as switching power supplies, cathode ray tubes (CRTs), Radars, or Sonars.

In another example, an unauthorized third party can use the strong interference signal to attack the ring oscillator 200 and mask the random effects of the noise of the ring oscillator. The interference signal may contain pseudorandom phase jitter, which leads to non-random phase drifts that are undistinguishable from true random noise by standard statistical tests. The interference signal could even have true random phase jitter that is measurable externally. The unauthorized third party can use the interference signal to attack the ring oscillator such that the phase jitter of the ring oscillator under attack can be known to the unauthorized third party. With the attack, the effects of the true random internal circuit noise can be masked, and the unauthorized third party can know the entropy values generated by the ring oscillator. If the entropy values are used in key generation, in key agreement protocols or in computing other secret or unpredictable numbers used in the computer system 110, the security of the computer system is lost.

In a further example, an unauthorized third party can use the strong interference signal to attack a ring based physical unclonable function (PUF) device. A PUF device can include multiple ring oscillators 200 and produce a chip-ID or a component of a root key used in the computer system 110 by performing frequency comparisons between pairs of the multiple ring oscillators. The unauthorized third party can use the strong interference signal to synchronize one or more of the multiple ring oscillators of the PUF device and make their frequencies equal to the frequency of the strong interference signal. In this example, the results of some frequency comparisons in the PUF device may change, and an incorrect chip-ID or root key may be computed.

In one example, the unauthorized third party can force certain individual ring oscillator 200 or groups of ring oscillators in the PUF device to alter their frequencies. For example, the unauthorized third party can inject the interference signal to the targeted ring oscillator at its oscillation frequency. When this particular ring oscillator starts up under interference, it locks to this interference signal. At this point the unauthorized third party can gradually tune the interference signal to higher or lower frequencies, which the targeted ring oscillator follows. Other ring oscillators in the PUF device may not follow or lock to the frequency of the interference signal. In this way the outcome of frequency comparisons of the PUF device can be altered and the abnormal conditions of the PUF device can be observed and mapped. By tuning to the smallest frequency offset to make the PUF device to malfunction, a single frequency comparison can be targeted.

In one example, when the change of frequency of a certain ring oscillator 200 or group of ring oscillator prevents the computer system 110 to boot up, the unauthorized third party can learn that the ring oscillators with the attacked frequencies are used in PUF computations, and the frequency changes cause some comparisons to deviate from the normal outcome. When different ring oscillators are attacked, by observing the boot up behavior of the computer system, the unauthorized third party can gain information that is enough to learn all the PUF values, or at least reduce the entropy of the PUF values such that an exhaustive search may reveal the true PUF values. The above described interference injection/tuning makes direct attacks on chip IDs or root keys feasible, therefore detecting such interference is important for the security of the computer system.

In some examples, the system 100 employs a plurality of ring oscillators 102 for interference detection. Each of the plurality of ring oscillators can be the ring oscillator 200 as shown in FIG. 2. The plurality of ring oscillators is equipped with a respective plurality of counters 205 configured to count impulses of oscillating outputs of the plurality of ring oscillators in predetermined time durations. In some examples, the control logic 101 is configured to start the respective plurality of ring oscillators, in other examples the control logic is configured to reset and start the counters, and stop the respective plurality of counters, over repeated counting periods to measure frequencies of the plurality of ring oscillators. In one example, the counters are activated for fixed time periods and measure the average frequency of the plurality of ring oscillators in corresponding time periods. In another example, the counters are configured to measure the duration of oscillation periods, counting the pulses of a high frequency clock signal between periods of the ring oscillators. The counters can be 14 . . . 32 bit wide in practice to give enough resolution for detecting frequency differences. For example, 16-bit counters can provide good resolution.

In some examples, the plurality of ring oscillators 102 is identical as designed but has different oscillation frequencies as manufactured. In one example, the oscillation frequencies of the identically designed ring oscillators may vary by 16% in certain environments depending on temperature and supply voltage. Temperature and voltage characteristics of the identically designed ring oscillators can be also different. The counter values of two selected ring oscillators may show a frequency difference as small as 1% or less in certain environments, but can be large (up to 16%) in other environments.

In one example, the system 100 employs many ring oscillators (e.g., 16), and the correlation between certain pairs of the ring oscillators are computed. When the manufacturing tolerances result in 16% variations of the oscillation frequencies, the system 100 implements at least n=16 ring oscillators. In this way, at every temperature/voltage point of operation there is a pair of ring oscillators with close enough oscillation frequencies (within 1% difference). The oscillation frequencies of the pair change with temperature and supply voltage. In this example, an interference signal may affect both of the two ring oscillators in the pair similarly. At larger manufacturing tolerances more ring oscillators may be needed. At tighter tolerances, fewer ring oscillators may be needed.

In some examples, the selector 103 is configured to select a group (e.g., a pair) of ring oscillators from the plurality of ring oscillators 102 (e.g., 16 ring oscillators 200). The group of ring oscillators is equipped with a respective group of counters 205 of the respective plurality of counters. In one example, if the system 100 employs 16 ring oscillators, there are 16*15/2=120 pairs to compute for correlations, which requires a lot of computations. To reduce the computations, in some examples, the selector 103 is configured to sort the first counter values from the respective plurality of counters and select the group of ring oscillators based on similarity of the counter values from the respective group of counters with which the group of ring oscillators is equipped.

In one example, the current frequencies (counter values) of the ring oscillators are first sorted, and only the correlations between neighbors (of similar frequencies) are calculated by the correlation determiner 104. In this example, the correlation determiner may only calculate the correlations between 15 counter sequences, which have values next to each other when sorted. Also, the notification generator 105 may only check if the difference of the 15 counter sequences has too many small values or not.

In one example, the sorting of 16 counter values can be performed with approximately 16·ln(16)≈ 44.36 comparisons, which means at least 45 comparisons. In another example, sorting algorithms or sorting networks can be used, which can sort 16 ring oscillator in 10 sets of parallel comparisons, e.g. by using Batcher's Merge-Exchange as shown in FIG. 3 below.

FIG. 3 illustrates a diagram 300 of a sorting network for the counter values for a plurality of ring oscillators, according to various example implementations. In one example, the 16 rows (0-15) of the diagram correspond to registers initially loaded with the counter values of the 16 ring oscillators, the input numbers. Each comparison of the counter values (marked with vertical arrows) is followed by a potential swap of the register contents, such that the register closer to the top of the diagram gets the smaller of the 2 compared numbers. For example, the first vertical arrow indicates a comparison and a potential swap of register contents between register 0 and register 8. Since no comparator has knowledge of what any other comparator has done, the arrangement of the comparators alone can guarantee that the inputs will be sorted. There are no conditional actions, which would require more complicated algorithms, e.g., fast merge-sort or heap-sort algorithms. In this sorting network there are 63 comparators, grouped into 10 parallel operations, executed in 10 clock cycles, or faster when asynchronous logic is used.

In one example, after performing the sorting step described above, there will be at least two very close counter values stored in registers next to each other. With 16% maximum frequency deviation, and 16 ring oscillators implemented, the smallest difference of the counter values is at most 1%. When the expected counter values are around 10,000, the difference of the closest counter values is around 100 (16 bit counters may contain values up to $2^{16}$=65,536).

In some examples, the selector 103 is configured to cluster the counter values from the respective plurality of counters into one or more clusters of counter values based on similarity of the counter values. The selector is also configured to select a cluster of the one or more clusters that includes the counter values from the respective group of counters with which the group of ring oscillators is equipped. For example, the sequences of the counter values next to each other in the sorted list can be clustered. The selector can find clusters of counter values that are close (e.g., less than 1% difference), which can be done at calibration time. In another example, the selector can keep only clusters with sufficiently different center values such as at least 1% difference, which also can be done at calibration time. The selector can choose a group (e.g., a pair) of representative counters from each cluster. The correlation determiner 104 can compute the correlation between the counter values in sufficiently distant clusters.

In one example, the selector 103 selects a pair of two ring oscillators, e.g., the ring oscillators 1021 and 1022. When the phase drift of the signals of the two ring oscillators becomes correlated, instead of independent random, the correlation may indicate that there is a strong interference, which affects these two ring oscillators. In this case the notification generator 105 can issue a warning or alarm to the operator of the computer system 110. The notification generator may also enter an error state or shut down the computer system to prevent insecure operation, according to the security policy of the computer system.

In one example, the phase drifts of an oscillation signal of a ring oscillator 200 can be characterized by counting the oscillation pulses over repeated counting periods. Each of the counting periods can have the same preset time duration. For a selected pair of two ring oscillators, the sequences of the corresponding counter values are affected by phase drifts caused by random noise and interference. In the absence of interference the correlation between the sequences of counter values of the two ring oscillators is low. If both oscillators are affected by the same interference, the correlation becomes large.

In one example, the correlation determiner 104 can determine the correlation between the signals of the two ring oscillators by taking the difference of their counter value sequences. The correlation determiner can determine the statistical distribution of the resulting sequence. An abnormal deviation from the expected distribution (e.g. too many 0s or very small values) indicates interference. In one example, the correlation determiner includes a counter that counts the occurrences of small values of the difference between the counter values from the pair of counters. If the proportion of small values exceeds a predefined portion (e.g., 20%), an interference is detected.

In one example, the correlation determiner 104 can count small differences by processing a sequence of bit values (a bit sequence). In some examples, the bit sequence is generated based on the counter values from the respective group or pair of counters 205. Each bit value of the sequence indicates whether the difference between a pair of the counter values from the respective group of counters is above or below the predefined threshold difference. For example, the correlation determiner can perform XOR operation on two counter value sequences of a pair of ring oscillators to generate the bit sequence. In the bit sequence, bit 0 indicates a small difference (e.g., below a predefined threshold difference) and bit 1 indicates a large difference (e.g., equal or above the predefined threshold difference). In another example, the value of small difference can be empirically set (e.g. less than 10% of the expected value of the difference).

In one example, the correlation determiner 104 can count the small difference by counting the number of 0s in a fixed length of the bit sequence for a counting period. The correlation determiner can restart the generation of the next bit sequence for subsequent calculation of correlation levels in a next counting period. In another example, the correlation determiner can continuously apply a sliding window and moving average filter on the bit sequence. The filter may be a general finite impulse response (FIR) filter applying non-uniform weights to the bit sequence. The current value of the FIR filter represents the correlation level. In another example, the correlation determiner can continuously apply an infinite impulse response (IIR) low-pass filter on the bit sequence, where the current filter value of the IIR filter represents the correlation level. The IIR filter can be an exponential moving average filter defined by the recursion: $y_n = \alpha\, x_n + (1-\alpha) y_{n-1}$, where $x_n$ is the current element of the bit sequence, and $y_n$ is the current filter value.

In some examples, if the correlation between the signals of the two ring oscillators is above a predefined threshold correlation, an interference is detected. When the difference between at least a predefined portion of the counter values from the respective group of counters is below a predefined threshold difference, it indicates that the correlation is above the predefined threshold correlation. For example, if at least 20% of the counter values from the respective group of counters have small differences (e.g. 0s or less than 10% of the expected value of the differences), it indicates that the correlation is above the predefined threshold correlation. The predefined threshold correlation can be set empirically (during calibration) by the results of off line measurements under various environmental conditions.

In some examples, the notification generator 105 is configured to generate a notification indicating interference in the group of ring oscillators and thereby the plurality of ring oscillators when the correlation is above a predefined threshold correlation. In one example, other ring oscillators in the system 100 may or may not be affected by the interference. The notification generator can tell that there is an interference affecting the group of ring oscillators. Therefore, there is a possibility, that the computer system 110 is under attack, or the environment in which the computer system operates does not meet specifications.

In one example, if there is no correlation or only small correlation (below the predefined threshold correlation) detected between the two ring oscillators which gave the closest counter values, at least one of them is unaffected by interference. There can be multiple such safe ring oscillators. The notification generator 105 may not be able to tell anything about potential interference at other frequencies, close to which no pairs of ring oscillators oscillate.

In one example, when no interference is detected, at least one ring oscillator is not synchronized to interference and safe to use. Hashing together the counter values of the two selected ring oscillators or all the counter values of the plurality of ring oscillators 102 can guarantee true randomness in the hash value. In this way, there is no need to determine which ring oscillator is actually unaffected by the interference.

In another example, in a ring based PUF device, multiple ring oscillators are implemented, e.g., more than 200 ring oscillators. Adequate security is needed for the PUF device. The multiple ring oscillators have to be laid out close together to prevent selective interference injection to specific locations of the silicone, e.g., with coils to inject EM signals to the PUF device. The corresponding multiple counter values may allow the detection of many cases of potential interference. A few representative frequencies (expected counter values) can be identified. Detecting correlations around the representative frequencies can cover the oscillation frequencies of most or all of the multiple ring oscillators. Therefore, when no interference is detected, it can reasonably indicate that most or all of the multiple ring oscillators in the PUF device are unsynchronized to the interference.

In one example, the computer system 110 has a security policy that can be enforced by firmware of the computer system. The security policy can run on a controller of the computer system, on an embedded microprocessor, or even on a simpler state machine with hard wired security policies. When interference is detected, this security policy can tell the notification generator 105 what to do. For example, based on the security policy, the notification generator can sound an alarm or send a warning to the operator, reset or shut down the computer system.

Figure 4:
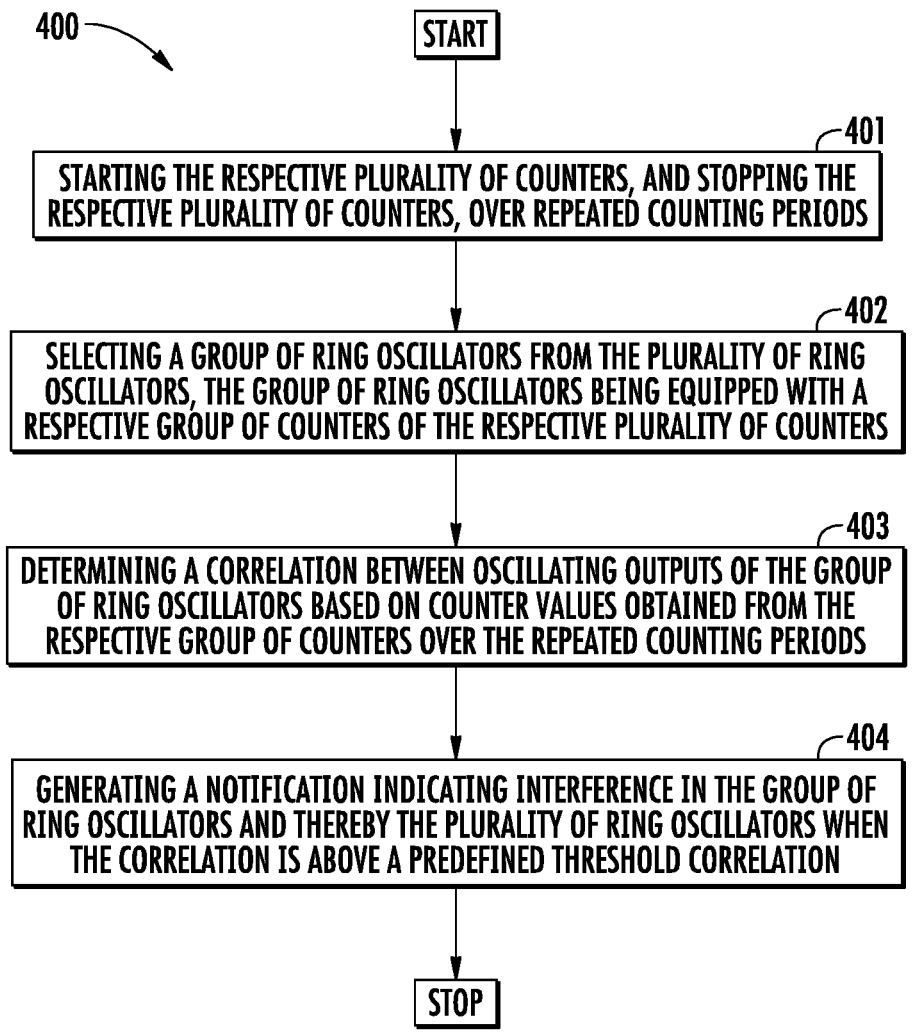
FIG. 4 is a flowchart illustrating various steps in a method of providing security in a computer system according to various example implementations.

FIG. 4 is a flowchart illustrating various steps in a method 400 of providing security in a computer system according to various example implementations. The method is implemented by the system 100 for providing security in the computer system 110. The system includes a plurality of ring oscillators 102 that are identical as designed but have different oscillation frequencies as manufactured. The plurality of ring oscillators is equipped with a respective plurality of counters 205 configured to count impulses of oscillating outputs of the plurality of ring oscillators. At block 401, the method includes starting the respective plurality of counters, and stopping the respective plurality of counters, over repeated counting periods. At block 402, the method includes selecting a group of ring oscillators from the plurality of ring oscillators. The group of ring oscillators is equipped with a respective group of counters of the respective plurality of counters. At block 403, the method includes determining a correlation between oscillating outputs of the group of ring oscillators based on counter values obtained from the respective group of counters over the repeated counting periods. The counter values indicate oscillation frequencies of respective ring oscillators of the group of ring oscillators. At block 404, the method includes generating a notification indicating interference in the group of ring oscillators and thereby the plurality of ring oscillators when the correlation is above a predefined threshold correlation.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising:
a plurality of ring oscillators that are identical as designed but have different oscillation frequencies as manufactured, the plurality of ring oscillators being equipped with a respective plurality of counters configured to count impulses of oscillating outputs of the plurality of ring oscillators; and
one or more logic circuits configured to at least:
start the respective plurality of counters, and stop the respective plurality of counters, over repeated counting periods;
select a group of ring oscillators from the plurality of ring oscillators, the group of ring oscillators being equipped with a respective group of counters of the respective plurality of counters, wherein the one or more logic circuits configured to select the group of ring oscillators includes being configured to:
sort counter values from the respective plurality of counters, and
select the group of ring oscillators based on similarity of the counter values from the respective group of counters with which the group of ring oscillators is equipped;
determine a correlation between oscillating outputs of the group of ring oscillators based on counter values obtained from the respective group of counters over the repeated counting periods, the counter values indicating oscillation frequencies of respective ring oscillators of the group of ring oscillators; and generate a notification indicating interference in the group of ring oscillators and thereby the plurality of ring oscillators when the correlation is above a predefined threshold correlation.

2. The system of claim 1, wherein the group of ring oscillators is a pair of ring oscillators, and the one or more logic circuits being configured to select the group of ring oscillators includes being configured to select the pair of ring oscillators from the plurality of ring oscillators.

3. The system of claim 1, wherein the one or more logic circuits being configured to determine the correlation between the oscillating outputs of the group of ring oscillators includes being configured to determine a difference between the counter values from the respective group of counters, and wherein the one or more logic circuits being configured to generate the notification includes being configured to generate the notification when the difference between at least a predefined portion of the counter values from the respective group of counters is below a predefined threshold difference that indicates the correlation is above the predefined threshold correlation.

4. The system of claim 3, wherein the one or more logic circuits being configured to determine the correlation includes being configured to:

generate a sequence of bit values for the group of ring oscillators based on the counter values from the respective group of counters, each bit value of the sequence indicating whether the difference between a pair of the counter values from the respective group of counters is above or below the predefined threshold difference; and apply a filter to the sequence to generate a filter value that indicates the correlation.

5. The system of claim 3, wherein the one or more logic circuits being configured to determine the difference includes being configured to perform arithmetic subtraction or exclusive-or operations on the counter values from the respective group of counters.

6. The system of claim 1, wherein the one or more logic circuits being configured to select the group of ring oscillators includes being configured to select multiple groups of ring oscillators from the plurality of ring oscillators, wherein the one or more logic circuits being configured to determine the correlation includes being configured to determine correlations between the oscillating outputs of the multiple groups of ring oscillators, and wherein the one or more logic circuits being configured to generate the notification includes being configured to generate the notification when any of the correlations is above the predefined threshold correlation.

7. The system of claim 1, wherein the one or more logic circuits being configured to generate the notification includes being configured to generate a visual or audible notification, or cause the computer system to shut down or reset.

8. A system for providing security in a computer system, the system comprising:

a plurality of ring oscillators that are identical as designed but have different oscillation frequencies as manufactured, the plurality of ring oscillators being equipped with a respective plurality of counters configured to count impulses of oscillating outputs of the plurality of ring oscillators; and one or more logic circuits configured to at least:

start the respective plurality of counters, and stop the respective plurality of counters, over repeated counting periods;

select a group of ring oscillators from the plurality of ring oscillators, the group of ring oscillators being equipped with a respective group of counters of the respective plurality of counters, wherein the one or more logic circuits configured to select the group of ring oscillators further includes being configured to:

cluster the counter values from the respective plurality of counters into one or more clusters of counter values based on similarity of the counter values, and select a cluster of the one or more clusters that includes the counter values from the respective group of counters with which the group of ring oscillators is equipped;

determine a correlation between oscillating outputs of the group of ring oscillators based on counter values obtained from the respective group of counters over the repeated counting periods, the counter values indicating oscillation frequencies of respective ring oscillators of the group of ring oscillators; and generate a notification indicating interference in the group of ring oscillators and thereby the plurality of ring oscillators when the correlation is above a predefined threshold correlation.

9. The system of claim 8, wherein the group of ring oscillators is a pair of ring oscillators, and the one or more logic circuits being configured to select the group of ring oscillators includes being configured to select the pair of ring oscillators from the plurality of ring oscillators.

10. The system of claim 8, wherein the one or more logic circuits being configured to generate the notification includes being configured to generate a visual or audible notification, or cause the computer system to shut down or reset.

11. A method implemented by a system for providing security in a computer system, the system comprising a plurality of ring oscillators that are identical as designed but have different oscillation frequencies as manufactured, the plurality of ring oscillators being equipped with a respective plurality of counters configured to count impulses of oscillating outputs of the plurality of ring oscillators, the method comprising:

starting the respective plurality of counters, and stopping the respective plurality of counters, over repeated counting periods;

selecting a group of ring oscillators from the plurality of ring oscillators, the group of ring oscillators being equipped with a respective group of counters of the respective plurality of counters, wherein selecting the group of ring oscillators includes:

sorting counter values from the respective plurality of counters, and selecting the group of ring oscillators based on similarity of the counter values from the respective group of counters with which the group of ring oscillators is equipped;

determining a correlation between oscillating outputs of the group of ring oscillators based on counter values obtained from the respective group of counters over the repeated counting periods, the counter values indicating oscillation frequencies of respective ring oscillators of the group of ring oscillators; and generating a notification indicating interference in the group of ring oscillators and thereby the plurality of ring oscillators when the correlation is above a predefined threshold correlation.

12. The method of claim 11, wherein the group of ring oscillators is a pair of ring oscillators, and selecting the group of ring oscillators includes selecting the pair of ring oscillators from the plurality of ring oscillators.

13. The method of claim 11, wherein determining the correlation between the oscillating outputs of the group of ring oscillators includes determining a difference between the counter values from the respective group of counters, and
wherein generating the notification includes generating the notification when the difference between at least a predefined portion of the counter values from the respective group of counters is below a predefined threshold difference that indicates the correlation is above the predefined threshold correlation.

14. The method of claim 13, wherein determining the correlation includes:
generating a sequence of bit values for the group of ring oscillators based on the counter values from the respective group of counters, each bit value of the sequence indicating whether the difference between a pair of the counter values from the respective group of counters is above or below the predefined threshold difference; and
applying a filter to the sequence to generate a filter value that indicates the correlation.

15. The method of claim 13, wherein determining the difference includes performing arithmetic subtraction or exclusive-or operations on the counter values from the respective group of counters.

16. The method of claim 11, wherein selecting the group of ring oscillators includes selecting multiple groups of ring oscillators from the plurality of ring oscillators,
wherein determining the correlation includes determining correlations between the oscillating outputs of the multiple groups of ring oscillators, and
wherein generating the notification includes generating the notification when any of the correlations is above the predefined threshold correlation.

17. The method of claim 11, wherein generating the notification includes at least one of generating a visual or audible notification, causing the computer system to shut down or causing the computer system to reset.

18. A method implemented by a system for providing security in a computer system, the system comprising a plurality of ring oscillators that are identical as designed but have different oscillation frequencies as manufactured, the plurality of ring oscillators being equipped with a respective plurality of counters configured to count impulses of oscillating outputs of the plurality of ring oscillators, the method comprising:
starting the respective plurality of counters, and stopping the respective plurality of counters, over repeated counting periods;
selecting a group of ring oscillators from the plurality of ring oscillators, the group of ring oscillators being equipped with a respective group of counters of the respective plurality of counters, wherein selecting the group of ring oscillators further includes:
clustering the counter values from the respective plurality of counters into one or more clusters of counter values based on similarity of the counter values, and
selecting a cluster of the one or more clusters that includes the counter values from the respective group of counters with which the group of ring oscillators is equipped;
determining a correlation between oscillating outputs of the group of ring oscillators based on counter values obtained from the respective group of counters over the repeated counting periods, the counter values indicating oscillation frequencies of respective ring oscillators of the group of ring oscillators; and
generating a notification indicating interference in the group of ring oscillators and thereby the plurality of ring oscillators when the correlation is above a predefined threshold correlation.

19. The method of claim 18, wherein the group of ring oscillators is a pair of ring oscillators, and selecting the group of ring oscillators includes selecting the pair of ring oscillators from the plurality of ring oscillators.

20. The method of claim 18, wherein generating the notification includes at least one of generating a visual or audible notification, causing the computer system to shut down or causing the computer system to reset.

* * * * *